(12) United States Patent
Zhong et al.

(10) Patent No.: US 11,375,675 B2
(45) Date of Patent: Jul. 5, 2022

(54) METHOD FOR TOMATO SOILLESS CULTIVATION WITH SUSPENDED TROUGH

(71) Applicant: Fujian Agriculture and Forestry University, Fuzhou (CN)

(72) Inventors: Fenglin Zhong, Fuzhou (CN); Jin Wang, Fuzhou (CN); Chunyu Shang, Fuzhou (CN); Ru Xu, Fuzhou (CN); Shubin Wang, Fuzhou (CN); Jiaming Li, Fuzhou (CN); Lu Chen, Fuzhou (CN); Xiaoli He, Fuzhou (CN); Danqing Yang, Fuzhou (CN)

(73) Assignee: FUJIAN ARGICULTURE AND FORESTRY UNIVERSITY, Fuzhou (CN)

( * ) Notice: Subject to any disclaimer, the term of this patent is extended or adjusted under 35 U.S.C. 154(b) by 289 days.

(21) Appl. No.: 16/705,231

(22) Filed: Dec. 6, 2019

(65) Prior Publication Data
US 2020/0214230 A1 Jul. 9, 2020

(30) Foreign Application Priority Data
Jan. 8, 2019 (CN) .......................... 201910013831.5

(51) Int. Cl.
*A01G 22/05* (2018.01)
*A01G 24/25* (2018.01)
*A01G 2/30* (2018.01)

(52) U.S. Cl.
CPC ............... *A01G 22/05* (2018.02); *A01G 2/30* (2018.02); *A01G 24/25* (2018.02)

(58) Field of Classification Search
CPC .......... A01G 22/05; A01G 24/25; A01G 2/30; A01G 31/00; A01G 31/02; A01G 31/042; A01G 31/06
See application file for complete search history.

(56) References Cited

U.S. PATENT DOCUMENTS 2,244,677 A * 6/1941 Cornell ................. A01G 9/143
47/17
3,667,157 A * 6/1972 Longhini ............ A01G 31/042
47/59 R
(Continued)

FOREIGN PATENT DOCUMENTS

CN 102405797 A * 4/2012
CN 107652036 A * 2/2018
(Continued)

OTHER PUBLICATIONS

CN108184465-A translation (Year: 2018).*
CN107652036-A translation (Year: 2018).*
CN102405797-A translation (Year: 2012).*

*Primary Examiner* — Peter M Poon
*Assistant Examiner* — Kari A Bradberry

(57) ABSTRACT

The present disclosure discloses a method for tomato soilless cultivation with suspended trough, including four aspects: setting of soilless cultivation substrate trough, preparation of soilless cultivation substrate, efficient and economical grafting and plant management. The efficient and economical grafting includes seedling raising, preparation of new scion, grafting and healing culture. The plant management includes planting, pruning and vine raising, flower and fruit management, and plant type maintenance. the present disclosure utilizes a soilless cultivation substrate trough, which can overcome the shortcomings of poor water retention, difficult control of temperature and water and fertilizer application in substrate bag cultivation and give full play to the characteristics of the cultivation substrate. The use of efficient and economical grafting and supporting plant management methods can optimize plants configuration, simplifying the work content of plant management, and improving the utilization rate of cultivation space.

4 Claims, 1 Drawing Sheet

(56) References Cited

U.S. PATENT DOCUMENTS 6,928,772 B2 * 8/2005 Bai ........................ A01G 9/126
                                                                                             47/62 R
2018/0228103 A1 * 8/2018 Su ........................... A01G 9/12

FOREIGN PATENT DOCUMENTS

CN          108184465 A * 6/2018
EP           1190620 A1 * 3/2002 ............. A01G 9/143

* cited by examiner

METHOD FOR TOMATO SOILLESS CULTIVATION WITH SUSPENDED TROUGH

CROSS-REFERENCE TO RELATED APPLICATIONS

The present disclosure claims the benefit of Chinese Patent Application No. CN201910013831.5, filed Jan. 8, 2019. The above is hereby incorporated by reference.

TECHNICAL FIELD

The present disclosure relates to the field of agricultural technology, and particularly relates to a method for tomato soilless cultivation with suspended trough.

BACKGROUND

Tomato is rich in protein, sugar, minerals and abundant vitamins, which is rich in nutrition and delicious in flavor. Its per capita consumption ranks first among vegetable and crops, and it is an important cultivated crop. Tomatoes have fast growth and development, strong branching and fruiting ability, but in the production process, problems such as uncoordinated vegetative growth and reproductive growth, irrational water and fertilizer supply, and falling flowers and fruits tend to occur. Therefore, plant management and fertilizer and water management must be carried out during the cultivation process, to improve plant environment, coordinate sink-source relationship, and regulate nutrient operation direction, so that water and fertilizer utilization can be increased, and thereby achieving high yield and quality.

The open field cultivation of tomatoes is restricted by factors such as arable land area, soil-borne diseases, continuous cropping obstacles, etc., which has led producers to turn to soilless cultivation. Soilless cultivation mainly includes fog cultivation, hydroponics and substrate cultivation. At present, soilless cultivation of tomatoes is mainly substrate cultivation. Soilless cultivation substrate bags are widely used in soilless cultivation of tomatoes due to their advantages such as excellent air permeability, easy drainage, and good for roots. However, with more and more water and fertilizer integrated systems are used for fertilization and irrigation in the production of tomatoes, some of the shortcomings of the substrate bag are gradually exposed. The substrate bag has poor water retention and consumes too much water, resulting in increased costs; the temperature and humidity in different parts are unstable and uneven, and it is difficult to grasp the usage rule of fertilizer and water; in addition, the use of the substrate bag cannot simplify the tomato cultivation management process and the manual investment in plant management is still big. Therefore, a new tomato soilless cultivation method is needed, which is fitted with the general trend of integrated fertilization and irrigation of water and fertilizer. While improving the water and fertilizer utilization rate of tomato cultivation and achieving high yield and quality, it also makes full use of limited cultivation space and simplifies tomato cultivation management procedures, so as to reduce production costs.

SUMMARY

One object of the present disclosure is to provide a method for tomato soilless cultivation with suspended trough, including four aspects: the setting of soilless cultivation substrate trough, the preparation of soilless cultivation substrate, efficient and economical grafting and plant management. The method provided by the present disclosure can fit the general trend of integrated fertilization and irrigation of water and fertilizer, optimize tomato plant configuration, simplify plant management, reduce production cost, improve water and fertilizer utilization rate, and achieve high yield and quality.

A method for tomato soilless cultivation with suspended trough, includes four aspects comprising setting of soilless cultivation substrate trough, preparation of soilless cultivation substrate, efficient and economical grafting and plant management.

The soilless cultivation substrate trough includes a rectangular substrate trough; drainage holes are provided on the bottom of the substrate trough and on the middle and upper portions of two walls of the substrate trough, a plurality of suspension bolts are provided on the two walls adjacent to a mouth of the substrate trough in parallel and side-by-side, the substrate trough is suspended by a side-by-side pulling rope with a hook at the lower end; a plurality of horizontal fixing ropes are fixed in the middle of the side-by-side pulling ropes and the plurality of horizontal fixing ropes are parallel and equidistant to each other; a rotating rod is connected to an upper end of the side-by-side pulling ropes; and an integrated water and fertilizer pipeline is arranged above the substrate trough.

The depth of the substrate trough is 30 to 50 cm, the width of the substrate trough is 30 to 40 cm, and the interval between the drainage holes at the bottom of the substrate trough and the drainage holes at the wall of the substrate trough is 1 to 1.5 m, the height of the drainage hole on the wall of the substrate trough is 75% of the depth of the substrate trough.

The soilless cultivation substrate adopts a coir dust and soybean composite substrate, which is prepared from coir dust, soybeans, and pig manure according to a mass ratio of 5-6:2-3:2-3. The soybeans are fully fermented by probiotics.

The specific operations of the efficient and economical grafting are as follows:

1) seedling raising: cultivating a scion seedling of tomato and a corresponding rootstock;

2) preparation of new scion: cutting and removing the upper tip of the scion seedling, and after the scion seedling has grown two side buds, cutting the scion seedling off from the stem part to form a new scion with two fruiting branches;

3) grafting: removing the upper tip of the rootstock, cutting a grafting incision, implanting the scion into the grafting incision of the rootstock and fixing the scion with a grafting clip to complete the grafting to form a grafted seedling; and 4) healing culture: placing the grafted seedling in an artificial climate room, controlling a condition that the temperature is at a range from 24° C. to 26° C., illumination is for 16 h/day, humidity is 75%, light intensity is 55 $\mu mol/(m^2 \, s)$ and a light ratio of red and blue is 2:1, so as to promote wound healing and The specific operations of the plant management are as follows:

(1) planting: planting the grafted seedling in a substrate trough filled with a cultivation substrate to ensure that the two fruiting branches of the grafted seedling branch off toward the substrate trough respectively;

(2) pruning and vine raising: cutting off all the side branches except the two fruiting branches after planting, and pulling the two fruiting branches toward the pulling ropes on the two walls of the substrate trough respectively; ensuring that main branches of two fruiting branches grow along the pulling ropes to form a V shape when vine raising, wherein an angle between the V shape and a vertical line of the horizontal plane is 30 degrees, so as to make better use of space and receive light;

(3) flower and fruit management: retaining fruit at the main branch of each fruiting branch naturally during the flowering and fruiting period, wherein each ear of the fruit retains well-proportioned, pest-free, non-traumatic, and fruity robust fruit; and (4) plant type maintenance: removing all side branches under the second or third inflorescence of each main branch of fruiting branches when budding and pruning, retaining 2 leaves on the side branches after the second or third inflorescence, and cutting the top tip off; removing all side branches under each ear before the each ear is ripe for picking; removing old leaves on a sunny day and airy condition, and removing leaves under each ear during fruit enlargement period to ensure a good development of upper fruits.

The coir dust can retain water and fertilizer and has good air permeability; the pig manure has a fine texture and is rich in organic matter and nutrients such as nitrogen, phosphorus, and potassium; the soybean fermentation is rich in sugars, organic acids, enzymes and bioactive substances, and a large number of microbial communities, thus they can effectively improve the rhizosphere environment. The three have wide sources and low prices, contain no pathogens, and have a long utilization cycle, which is suitable as a soilless cultivation substrate.

The present disclosure utilizes a soilless cultivation substrate trough, which can overcome the shortcomings of poor water retention of the substrate bag cultivation, difficult control of the cultivation temperature and the application of water and fertilizer, and make full use of the characteristics of the composite substrate of coir dust and soybeans. The soilless cultivation substrate trough works with the efficient and economical grafting and the plant management can optimize the plant configuration, simplify the work of plant management, and improve the utilization rate of cultivation space. All of these can fit the general trend of integrated fertilization and irrigation of water and fertilizer, make the supply of fertilizer and water match the needs of plant growth, to make full use of the potential high yield of the tomato while improving the utilization rate of water and fertilizer, thereby improving the yield and quality of tomatoes. In addition, the scion of the grafted seedlings described in the efficient and economical grafting method can be used multiple times, which can reduce production costs and increase revenue.

Figure 1:
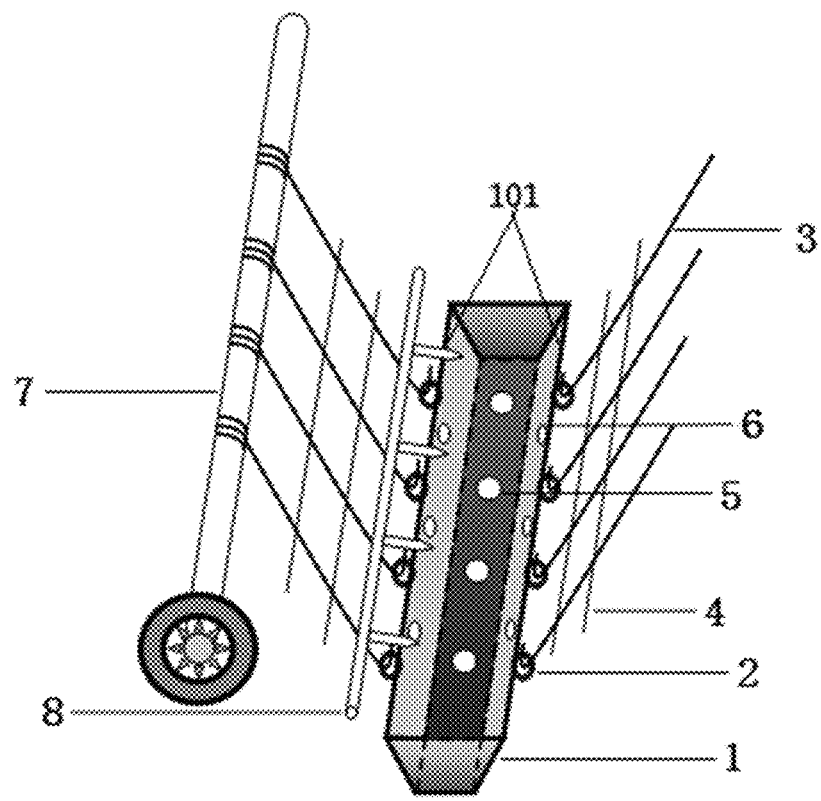
FIG. 1 is a diagram showing the structure of soilless cultivation substrate trough.
Figure 2:
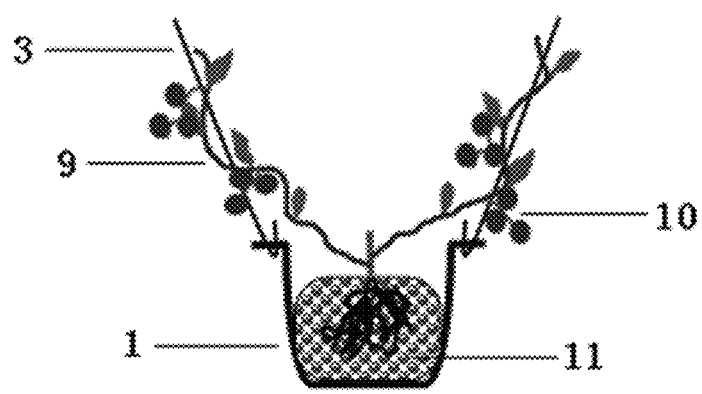
FIG. 2 is a diagram showing the growth pattern of tomato in soilless cultivation substrate trough.

In the Figures: 1-substrate trough, 101-mouth, 2-suspension bolt, 3-side-by-side pulling rope, 4-horizontal fixing rope, 5-drainage hole at the bottom of trough, 6-drainage hole at the wall of trough, 7-rotating rod, 8-integrated water and fertilizer pipeline, 9-tomato fruit branch, 10 tomato ear, 11 cultivation substrate.

DETAILED DESCRIPTION OF THE EMBODIMENTS

In order to make the content described in the present disclosure easier to understand, the present disclosure is further described below in combination with specific embodiments, but the present disclosure is not limited thereto.

A method for tomato soilless cultivation with suspended trough, includes four aspects: setting of soilless cultivation substrate trough, preparation of soilless cultivation substrate, efficient and economical grafting and plant management.

The soilless cultivation substrate trough includes a rectangular substrate trough 1, the depth of the substrate trough is 40 cm, and the width of the substrate trough is 30 cm, and drainage holes are provided on the bottom and on the middle and upper portion of two walls of the substrate trough. The interval between the drainage holes at the bottom of the substrate trough and the drainage holes at the wall of the substrate trough is 1 m, the height of the drainage hole on the wall of the substrate trough is 30 cm. A plurality of suspension bolts 2 are provided on the two walls adjacent to a mouth of notches of the two walls of the substrate trough 1 in parallel and side-by-side, the substrate trough 1 is suspended by a side-by-side pulling rope 3 with a hook at the lower end. A plurality of horizontal fixing ropes 4 are fixed in the middle of the side-by-side pulling ropes 3 and the plurality of horizontal fixing ropes 4 are parallel and equidistant to each other. A rotating rod 7 is connected to an upper end of the side-by-side pulling ropes 3, the motion and lifting of the substrate trough 1 are controlled by the rotating rod 7. An integrated water and fertilizer pipeline 8 is arranged above the substrate trough 1.

The soilless cultivation substrate adopts a coir dust and soybean composite substrate, which is prepared from coir dust, soybeans, and pig manure according to a mass ratio of 5-6:2-3:2-3. The soybeans are fully fermented by probiotics.

The specific operations of the efficient and economical grafting are as follows:

1) seedling raising: cultivating a scion seedling of tomato and a corresponding rootstock;

2) preparation of new scion: cutting and removing the upper tip of the scion seedling, and after the scion seedling has grown two side buds, cutting the scion seedling off from the stem part to form a new scion with two fruiting branches;

3) grafting: removing the upper tip of the rootstock, cutting a grafting incision, implanting the scion into the grafting incision of the rootstock and fixing the scion with a grafting clip to complete the grafting to form a grafted seedling; and 4) healing culture: placing the grafted seedling in an artificial climate room, controlling a condition that the temperature is at a range from 24° C. to 26° C., illumination is for 16 h/day, humidity is 75%, light intensity is 55 µmol/(m² s) and a light ratio of red and blue is 2:1, so as to promote wound healing and cultivate the grafted seedling strong.

The specific operations of the plant management are as follows:

(1) planting: planting the grafted seedling in a substrate trough filled with a cultivation substrate to ensure that the two fruiting branches of the grafted seedling branch off toward the substrate trough respectively;

(2) pruning and vine raising: cutting off all the side branches except the two fruiting branches after planting, and pulling the two fruiting branches toward the pulling ropes on the two walls of the substrate trough respectively; ensuring that main branches of two fruiting branches grow along the pulling ropes to form a V shape when vine raising, wherein an angle between the V shape and a vertical line of the horizontal plane is 30 degrees, so as to make better use of space and receive light;

(3) flower and fruit management: retaining fruit at the main branch of each fruiting branch naturally during the flowering and fruiting period, wherein each ear of the fruit retains well-proportioned, pest-free, non-traumatic, and fruity robust fruit; and (4) plant type maintenance: removing all side branches under the second or third inflorescence of each main branch of fruiting branches when budding and pruning, retaining 2 leaves on the side branches after the second or third inflorescence, and cutting the top tip off; removing all side branches under each ear before the each ear is ripe for picking; removing old leaves on a sunny day and airy condition, and removing leaves under each ear during fruit enlargement period to ensure a good development of upper fruits.

Refer to the tomato water and fertilizer formula in patent (CN105519420A) for integrated fertilization of water and fertilizer method, as shown in Table 1.

TABLE 1

Integrated fertilization of water and fertilizer formula

| Growth period | Nutrient formula $N-P_2O_5-K_2O$ | Amount of fertilizer applied each time/ $kg \cdot (667\ m^2)^{-1}$ | Times of fertilization | Water consumption per irrigation/$m^3$ |
|---|---|---|---|---|
| seedling stage (7-10 d) | 16-20-14 + TE | 6 | 1 | 13 |
| Flowering and fruit setting (10-15 d) | 16-20-14 + TE | 13 | 1 | 13 |
| Fruit enlargement (55-60 d) | 22-4-24 + TE | 11 | 4 | 13 |
| Initial period of harvest (35-40 d) | 22-4-24 + TE | 8 | 4 | 13 |
| Peak period of Harvest (65-75 d) | 20-5-25 + TE | 10 | 8 | 13 |
| End period of harvest (30-35 d) | 20-5-25 + TE | 7 | 2 | 13 |

N is derived from potassium nitrate and calcium nitrate, $P_2O_5$ is derived from calcium superphosphate and sodium phosphate, and $K_2O$ is derived from potassium nitrate and potassium sulfate.

Embodiment 1

The large fruit tomatoes 'Fufen No. 1' and cherry tomato 'Fumi 102' mainly planted in Fujian province were used as trial varieties. The soilless cultivation facilities respectively used substrate bags and soilless cultivation substrate troughs provided by the present disclosure. The coir dust and soybean composite substrate is prepared from coir dust, soybeans, and pig manure according to a mass ratio of 5:3:2. The integrated fertilization of water and fertilizer formula for tomato soilless cultivation is shown in Table 1. 50% water-soluble fertilizer is recommended as an example, total application amount in growth period is 179 to 199 kg (667 $m^2)^{-1}$. The cultivated seedlings adopt the efficient and economical grafted seedlings provided by the present disclosure. The plant management includes the operation procedures such as planting, pruning, flower and fruit management, and plant type maintenance are the same.

The yield and quality of tomatoes obtained from the substrate bag and the soilless cultivation substrate trough cultivation provided by the present disclosure are shown in Table 2.

It can be seen from Table 2 that compared with the substrate bag cultivation, the single fruit weight, yield per plant and fruit quality of the large fruit tomatoes and cherry tomatoes cultivated in the substrate trough provided by the present disclosure are significantly promoted. This shows that the soilless cultivation substrate trough provided by the present disclosure, compared with the substrate bag, can improve the utilization rate of water and fertilizer and promote the increase of yield, and has a good effect on improving fruit quality.

Embodiment 2

The large fruit tomatoes 'Fufen No. 1' and cherry tomato 'Fumi 102' mainly planted in Fujian province were used as trial varieties. The soilless cultivation facilities were used the soilless cultivation substrate troughs provided by the present disclosure. The cultivation substrate were the ordinary coir dust and peat composite substrate and the coir dust and soybean composite substrate provided by the present disclosure (the mass ratio of coir dust, soybeans, and pig manure is 5:3:2), respectively. The integrated fertilization of water and fertilizer formula for tomato soilless cultivation is shown in Table 1. 50% water-soluble fertilizer is recommended as an example, total application amount in growth period is 179 to 199 kg·(667 $m^2)^{-1}$. The cultivated seedlings adopt the efficient and economical grafted seedlings pro-

TABLE 2

Effects of different cultivation facilities on yield and quality of tomato

| cultivation facilities | Tomato type | single fruit weight (g) | yield per plant (kg) | Vc (mg/100 g) | Protein (mg/g) | Soluble sugar (%) | Organic acid (%) | Lycopene (mg/100 g) |
|---|---|---|---|---|---|---|---|---|
| substrate bags | large fruit tomatoes | 221.1 | 11.65 | 19.84 | 9.23 | 3.13 | 0.529 | 1.38 |
| substrate troughs | large fruit tomatoes | 243.8 | 13.83 | 23.87 | 11.14 | 3.77 | 0.608 | 1.93 |
| substrate bags | cherry tomato | 17.1 | 10.83 | 40.44 | 9.32 | 4.83 | 0.579 | 1.86 |
| substrate troughs | cherry tomato | 18.7 | 11.33 | 42.87 | 10.19 | 5.84 | 0.668 | 2.53 | vided by the present disclosure. The plant management includes the operation procedures such as planting, pruning, flower and fruit management, and plant type maintenance are the same.

The yield and quality of tomato cultivated in the ordinary coir dust and peat composite substrate and the coir dust and soybean composite substrate provided by the invention are shown in Table 3.

manure according to a mass ratio of 5:3:2. The integrated fertilization of water and fertilizer formula for tomato soilless cultivation is shown in Table 1. 50% water-soluble fertilizer is recommended as an example, total application amount in growth period is 179 to 199 kg $(667\ m^2)^{-1}$. The cultivated seedlings adopt the ordinary grafted seedlings and the efficient and economical grafted seedlings provided by the present disclosure, respectively. The plant management

TABLE 3

Effects of different cultivation substrates on yield and quality of tomato

| cultivation substrate | Tomato type | single fruit weight (g) | yield per plant (kg) | Vc (mg/100 g) | Protein (mg/g) | Soluble sugar (%) | Organic acid (%) | Lycopene (mg/100 g) |
|---|---|---|---|---|---|---|---|---|
| ordinary | large fruit tomatoes | 212.7 | 10.52 | 19.12 | 9.15 | 3.14 | 0.521 | 1.32 |
| coir dust and soybean composite substrate | large fruit tomatoes | 243.8 | 13.83 | 23.87 | 11.14 | 3.77 | 0.608 | 1.93 |
| ordinary | cherry tomato | 16.6 | 9.95 | 40.69 | 9.06 | 4.68 | 0.567 | 1.93 |
| coir dust and soybean composite substrate | cherry tomato | 18.7 | 11.33 | 42.87 | 10.19 | 5.84 | 0.668 | 2.53 |

It can be seen from Table 3, compared with the coir dust and peat composite substrate cultivation, the fruit quality of large fruit tomatoes and cherry tomatoes cultivated by using the coir dust and soybean composite substrate provided by the present disclosure is significantly improved, and the single fruit weight and yield per plant are significantly increased. The single fruit weight and yield per plant of large fruit tomatoes are increased by 1.15 and 1.31 times, respectively, and that of cherry tomatoes are increased by 1.13 and 1.14 times. This shows that the coir dust and soybean composite substrate provided by the present disclosure, compared with the coir dust and peat composite substrate, can improve the fruit quality of cultivated tomatoes and significantly increase yield.

Embodiment 3

The large fruit tomatoes 'Fufen No. 1' and cherry tomato 'Fumi 102' mainly planted in Fujian province were used as trial varieties. The soilless cultivation facilities were used the soilless cultivation substrate troughs provided by the present disclosure. The coir dust and soybean composite substrate is prepared from coir dust, soybeans, and pig includes the operation procedures such as planting, pruning, flower and fruit management, and plant type maintenance are the same.

The yield and quality of the tomatoes obtained from the cultivation of ordinary grafted seedlings and the efficient and economical grafted seedlings provided by the present disclosure are shown in Table 4.

TABLE 4

Effects of different grafting methods on yield and quality of tomato

| grafting type | Tomato type | the first inflorescence node | single fruit weight (g) | yield per plant (kg) | Vc (mg/100 g) | Protein (mg/g) | Soluble sugar (%) | Organic acid (%) | Lycopene (mg/100 g) |
|---|---|---|---|---|---|---|---|---|---|
| ordinary | large fruit tomatoes | 7-8 | 242.2 | 10.85 | 23.78 | 11.17 | 3.81 | 0.589 | 1.84 |
| efficient and economical | large fruit tomatoes | 3-4 | 243.8 | 13.83 | 23.87 | 11.14 | 3.77 | 0.608 | 1.93 |
| ordinary | cherry tomato | 6-7 | 17.9 | 9.43 | 42.33 | 10.01 | 5.53 | 0.656 | 2.38 |
| efficient and economical | cherry tomato | 2-3 | 18.7 | 11.33 | 42.87 | 10.19 | 5.84 | 0.668 | 2.53 |

It can be seen from Table 4 that compared with ordinary grafted seedlings, the single fruit weight and fruit quality of large fruit tomatoes and cherry tomatoes grown with the efficient and economical grafted seedlings provided by the present disclosure have not changed significantly, but the first inflorescence nodes have been reduced by 4-5, and the yield per plant was significantly improved. This shows that the efficient and economical grafting method provided by the present disclosure, compared with ordinary grafting method, can promote the premature of tomato and significantly increase the yield.

Embodiment 4

The large fruit tomatoes 'Fufen No. 1' and cherry tomato 'Fumi 102' mainly planted in Fujian province were used as trial varieties. The soilless cultivation facilities were used the soilless cultivation substrate troughs provided by the present disclosure. The coir dust and soybean composite substrate is prepared from coir dust, soybeans, and pig manure according to a mass ratio of 5:3:2. The integrated fertilization of water and fertilizer formula for tomato soilless cultivation is shown in Table 1. 50% water-soluble fertilizer is recommended as an example, total application amount in growth period is 179 to 199 kg·(667 m²)⁻¹. The cultivated seedlings adopt the efficient and economical grafted seedlings provided by the present disclosure. In plant management, ordinary two-stem pruning and V shaped pruning provided by the present disclosure are used for pruning and vine raising, respectively. Others operation procedures such as planting, flower and fruit management, and plant type maintenance are the same.

The yield and quality of tomatoes obtained from cultivation of ordinary two-stem pruning and the V shaped pruning method provided by the present disclosure are shown in Table 5.

TABLE 5

Effects of different pruning methods on yield and quality of tomato

| pruning method | Tomato type | single fruit weight (g) | yield per plant (kg) | Vc (mg/100 g) | Protein (mg/g) | Soluble sugar (%) | Organic acid (%) | Lycopene (mg/100 g) |
|---|---|---|---|---|---|---|---|---|
| ordinary two-stem pruning | large fruit tomatoes | 232.2 | 13.37 | 21.49 | 10.33 | 3.35 | 0.577 | 1.68 |
| V shaped pruning | large fruit tomatoes | 243.8 | 13.83 | 23.87 | 11.14 | 3.77 | 0.608 | 1.93 |
| ordinary two-stem pruning | cherry tomato | 18.1 | 11.08 | 41.71 | 9.82 | 5.24 | 0.638 | 2.22 |
| V shaped pruning | cherry tomato | 18.7 | 11.33 | 42.87 | 10.19 | 5.84 | 0.668 | 2.53 |

It can be known from Table 5 that compared with ordinary two-stem pruning, the single fruit weight and yield per plant of large fruit tomatoes and cherry tomatoes cultivated by using the V shaped pruning method provided by the present disclosure are improved to a certain degree, and the improvement of fruit quality is even more significantly. This shows that the V shaped pruning method provided by the present disclosure, compared with ordinary two-stem pruning, can optimize the plant configuration, promote the production and increase the yield, and improve the fruit quality.

The description above are only preferred embodiments of the present disclosure, and any equivalent changes and modifications made in accordance with the scope of patent application of the present disclosure shall fall within the scope of the present disclosure.

What is claimed is:

1. A method for tomato soilless cultivation with suspended trough, comprising four aspects: setting of a soilless cultivation substrate trough, preparation of soilless cultivation substrate, efficient and economical grafting and plant management;

the soilless cultivation substrate trough comprises a rectangular substrate trough; drainage holes are provided on a bottom of the rectangular substrate trough and on a middle and upper portion of two walls of the rectangular substrate trough, a plurality of suspension bolts are provided on the two walls adjacent to a mouth of the rectangular substrate trough in parallel and side-by-side, the rectangular substrate trough is suspended by a plurality of side-by-side pulling ropes with a hook at a lower end; a plurality of horizontal fixing ropes are fixed in a middle of the plurality of side-by-side pulling ropes and the plurality of horizontal fixing ropes are parallel and equidistant to each other; a rotating rod is connected to an upper end of the plurality of side-by-side pulling ropes; and an integrated water and fertilizer pipeline is arranged above the rectangular substrate trough;

the soilless cultivation substrate adopts a coir dust and soybean composite substrate, wherein the coir dust and soybean composite substrate is prepared from coir dust, soybeans, and pig manure according to a mass ratio of 5-6: 2-3: 2-3;

the efficient and economical grafting comprises seedling raising, preparation of a scion, grafting and healing culture, and specific operations are as follows:
1) seedling raising: cultivating a scion seedling of tomato and a rootstock seedling;
2) preparation of the scion: cutting and removing an upper tip of the scion seedling, and after the scion seedling has grown two side buds, cutting the scion seedling off from a stem part to form the scion with two fruiting branches;
3) grafting: removing an upper tip of the rootstock, cutting a grafting incision, implanting the scion into the grafting incision of the rootstock and fixing the scion with a grafting clip to complete the grafting to form a grafted seedling; and
4) healing culture: placing the grafted seedling in an artificial climate room, controlling a condition that a temperature is at a range from 24° C. to 26° C., illumination is for 16 h / day, humidity is 75%, light intensity is 55 μmol / (m² s) and a light ratio of red and blue is 2: 1, so as to promote wound healing and cultivate the grafted seedling strong;

the plant management comprises planting, pruning and vine raising, flower and fruit management, and plant type maintenance, and specific operations are as follows:
(1) planting: planting the grafted seedling in the rectangular substrate trough filled with the soilless cultivation substrate to ensure that the two fruiting branches of the grafted seedling branch off toward the rectangular substrate trough respectively;
(2) pruning and vine raising: cutting off all side branches except the two fruiting branches after planting, and pulling the two fruiting branches toward the plurality of side-by-side pulling ropes on the two walls of the rectangular substrate trough, respectively; ensuring that main branches of the two fruiting branches grow along the plurality of side-by-side pulling ropes to form a "V" shape when vine raising, wherein an angle between the "V" shape and a vertical line of a horizontal plane is 30 degrees, so as to make good use of space and receive light;

(3) flower and fruit management: retaining fruit at the main branch of each fruiting branch naturally during the flowering and fruiting period, wherein each ear of the fruit retains well-proportioned, pest-free, non-traumatic, and fruity robust fruit;

(4) plant type maintenance: removing all side branches under the second or third inflorescence of each main branch of fruiting branches when budding and pruning, retaining 2 leaves on the side branches after the second or third inflorescence, and cutting top tip off; removing all side branches under each ear before the each ear is ripe for picking; removing old leaves on a sunny day and airy condition, and removing leaves under each ear during fruit enlargement period to ensure a good development of upper fruits.

2. The method for tomato soilless cultivation with suspended trough of claim 1, wherein a depth of the rectangular substrate trough is 30-50 cm, a width of the rectangular substrate trough is 30-40 cm, and intervals between the drainage holes at the bottom of the rectangular substrate trough and the drainage holes at the wall of the rectangular substrate trough is 1-1.5 m, a height of the drainage hole on the wall of the rectangular substrate trough is 75% of the depth of the substrate trough.

3. The method for tomato soilless cultivation with suspended trough of claim 1, wherein the soybeans in the soilless cultivation substrate are fully fermented by probiotics.

4. The method for tomato soilless cultivation with suspended trough of claim 1, wherein the tomato is an infinite-growing tomato, including large tomatoes and small tomatoes.

\* \* \* \* \*